(12) United States Patent
Akella et al.

(10) Patent No.: US 6,976,244 B2
(45) Date of Patent: Dec. 13, 2005

(54) METHOD, SYSTEM, AND PRODUCT FOR STORAGE OF ATTRIBUTE DATA IN AN OBJECT ORIENTED ENVIRONMENT

(75) Inventors: Raji Lakshmi Akella, Austin, TX (US); Beju Ekperigin, Austin, TX (US); Michael Albert Perks, Austin, TX (US); Sean Michael Sundberg, Waco, TX (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 10/042,482

(22) Filed: Jan. 9, 2002

(65) Prior Publication Data

US 2003/0131341 A1 Jul. 10, 2003

(51) Int. Cl.⁷ .............................................. G06F 9/44
(52) U.S. Cl. ...................................... 717/116; 717/108
(58) Field of Search ........................ 717/114, 116, 166, 717/165; 707/103 R, 103, 103 Y, 103 Z

(56) References Cited

U.S. PATENT DOCUMENTS

| | | | |
|---|---|---|---|
| 4,649,473 A | 3/1987 | Hammer et al. .............. 364/200 |
| 4,816,653 A | 3/1989 | Anderl et al. ................ 235/380 |
| 5,233,686 A | 8/1993 | Rickenbach et al. ......... 395/158 |
| 5,317,741 A | 5/1994 | Schwanke .................... 395/700 |
| 5,317,746 A | 5/1994 | Watanabe ..................... 395/700 |
| 5,369,778 A | 11/1994 | San Soucie et al. ......... 395/800 |
| 5,396,630 A | 3/1995 | Banda et al. ................. 395/700 |
| 5,408,650 A | 4/1995 | Arsenault ..................... 395/575 |
| 5,408,659 A | 4/1995 | Cavendish et al. .......... 395/650 |
| 5,418,961 A * | 5/1995 | Segal et al. ....................... 707/1 |
| 5,438,676 A | 8/1995 | Schwanke .................... 395/650 |
| 5,560,014 A | 9/1996 | Imamura ...................... 395/700 |
| 5,566,330 A | 10/1996 | Sheffield ...................... 395/600 |
| 5,634,124 A | 5/1997 | Khoyi et al. ................. 395/614 |
| 5,675,755 A | 10/1997 | Trueblood .................... 395/346 |
| 5,704,029 A | 12/1997 | Wright, Jr. ................... 395/149 |
| 5,710,920 A | 1/1998 | Maruyama et al. .......... 395/614 |
| 5,713,045 A | 1/1998 | Berdahl ........................ 395/893 |
| 5,724,589 A | 3/1998 | Wold ............................ 395/701 |
| 5,752,018 A | 5/1998 | Sheffield ...................... 395/602 |
| 5,758,152 A | 5/1998 | LeTourneau ................. 395/613 |
| 5,761,509 A | 6/1998 | Danforth et al. ............. 395/701 |
| 5,764,230 A | 6/1998 | Baradel et al. .............. 345/346 |
| 5,787,431 A | 7/1998 | Shaughnessy ................ 707/100 |
| 5,801,701 A | 9/1998 | Koppolu et al. ............. 345/352 |
| 5,805,892 A | 9/1998 | Nakajima ..................... 395/704 |
| 5,812,849 A | 9/1998 | Nykiel et al. ................ 395/701 |
| 5,819,055 A | 10/1998 | MacLean et al. ............ 395/342 |

(Continued)

OTHER PUBLICATIONS

Sullivan et al., "Reconciling Environment Integration and Software Evolution", ACM Transactions on Software Engineering and Methodology, vol. 1, No. 3, Jul. 1992, pp. 229-268.

(Continued)

*Primary Examiner*—Tuan Dam
*Assistant Examiner*—John J. Romano
(74) *Attorney, Agent, or Firm*—Duke W. Yee; David A. Mims, Jr.; Lisa L. B. Yociss

(57) ABSTRACT

A method, system, and computer program product are described for storing attribute data in an object oriented environment. A base class and a subclass are defined within an object. The object is defined within the object oriented environment. An attribute is defined within the subclass. The attribute data defined for the subclass is stored within the base class. The attribute data is not stored within the subclass.

33 Claims, 4 Drawing Sheets

U.S. PATENT DOCUMENTS

| | | | | |
|---|---|---|---|---|
| 5,822,580 | A | 10/1998 | Leung | 395/614 |
| 5,835,914 | A | 11/1998 | Brim | 707/206 |
| 5,838,969 | A | 11/1998 | Jacklin et al. | 395/680 |
| 5,892,510 | A | 4/1999 | Lau et al. | 345/333 |
| 5,893,118 | A | 4/1999 | Sonderegger | 707/203 |
| 5,926,177 | A | 7/1999 | Hatanaka et al. | 345/340 |
| 5,973,702 | A | 10/1999 | Orton et al. | 345/433 |
| 5,974,428 | A | 10/1999 | Gerard et al. | 707/203 |
| 5,983,384 | A | 11/1999 | Ross | 713/200 |
| 6,002,874 | A | 12/1999 | Bahrs et al. | 395/705 |
| 6,003,037 | A * | 12/1999 | Kassabgi et al. | 707/103 R |
| 6,003,042 | A | 12/1999 | Melahn | 707/203 |
| 6,023,271 | A | 2/2000 | Quaeler-Bock et al. | 345/335 |
| 6,026,413 | A | 2/2000 | Challenger et al. | 707/202 |
| 6,029,182 | A | 2/2000 | Nehab et al. | 707/523 |
| 6,035,303 | A | 3/2000 | Baer et al. | 707/103 |
| 6,052,528 | A * | 4/2000 | Dechamboux | 717/116 |
| 6,054,985 | A | 4/2000 | Morgan et al. | 345/342 |
| 6,054,996 | A | 4/2000 | Bardon et al. | 345/433 |
| 6,064,382 | A | 5/2000 | Diedrich et al. | 345/335 |
| 6,085,120 | A | 7/2000 | Schwerdtfeger et al. | 700/90 |
| 6,091,411 | A | 7/2000 | Straub et al. | 345/333 |
| 6,108,583 | A | 8/2000 | Schneck et al. | 700/9 |
| 6,112,024 | A | 8/2000 | Almond et al. | 395/703 |
| 6,115,646 | A | 9/2000 | Fiszman et al. | 700/181 |
| 6,134,676 | A | 10/2000 | VanHuben et al. | 714/39 |
| 6,138,269 | A * | 10/2000 | Ball et al. | 717/108 |
| 6,148,306 | A | 11/2000 | Seidl et al. | 707/104 |
| 6,167,523 | A | 12/2000 | Strong | 713/201 |
| 6,169,546 | B1 | 1/2001 | Bogdan | 345/339 |
| 6,175,364 | B1 | 1/2001 | Wong et al. | |
| 6,177,936 | B1 | 1/2001 | Cragun | 345/340 |
| 6,182,154 | B1 | 1/2001 | Campagnoni et al. | 709/315 |
| 6,185,583 | B1 | 2/2001 | Blando | 707/507 |
| 6,185,590 | B1 | 2/2001 | Klein | 707/526 |
| 6,185,684 | B1 | 2/2001 | Pravetz et al. | 713/182 |
| 6,202,207 | B1 | 3/2001 | Donohue | 717/11 |
| 6,208,339 | B1 | 3/2001 | Atlas et al. | 345/338 |
| 6,208,994 | B1 | 3/2001 | Abdelnur | 707/103 |
| 6,211,872 | B1 | 4/2001 | Matsutsuka et al. | 345/339 |
| 6,230,159 | B1 * | 5/2001 | Golde | 707/103 R |
| 6,237,011 | B1 | 5/2001 | Ferguson et al. | 707/515 |
| 6,249,284 | B1 | 6/2001 | Bogdan | 345/357 |
| 6,272,641 | B1 | 8/2001 | Ji | 713/201 |
| 6,275,228 | B1 | 8/2001 | Cataudella | 345/339 |
| 6,275,232 | B1 | 8/2001 | Cataudella et al. | 345/349 |
| 6,292,803 | B1 | 9/2001 | Richardson et al. | 707/102 |
| 6,292,933 | B1 * | 9/2001 | Bahrs et al. | 717/107 |
| 6,295,553 | B1 | 9/2001 | Gilbertson et al. | 709/207 |
| 6,307,571 | B2 | 10/2001 | Mozdzer et al. | 345/762 |
| 6,330,659 | B1 | 12/2001 | Poff et al. | 712/34 |
| 6,335,741 | B1 | 1/2002 | Nock | 345/764 |
| 6,355,741 | B1 | 3/2002 | Marechal | 526/64 |
| 6,362,839 | B1 | 3/2002 | Hamilton et al. | 345/764 |
| 6,425,126 | B1 | 7/2002 | Branson et al. | 717/168 |
| 6,438,617 | B1 | 8/2002 | Savitzky et al. | 709/316 |
| 6,442,620 | B1 | 8/2002 | Thatte et al. | 709/316 |
| 6,442,754 | B1 | 8/2002 | Curtis | 717/175 |
| 6,457,142 | B1 | 9/2002 | Klemm et al. | 714/38 |
| 6,469,714 | B2 | 10/2002 | Buxton et al. | 345/762 |
| 6,493,871 | B1 | 12/2002 | Welch et al. | 717/173 |
| 6,532,498 | B1 | 3/2003 | Hager et al. | 709/318 |
| 6,539,388 | B1 * | 3/2003 | Hattori et al. | 707/101 |
| 6,556,218 | B1 | 4/2003 | Alcorn | 345/749 |
| 6,557,046 | B1 | 4/2003 | McCauley, III et al. | 709/318 |
| 6,560,770 | B1 | 5/2003 | Saxena et al. | 717/107 |
| 6,590,594 | B2 | 7/2003 | Bates et al. | 345/784 |
| 6,611,498 | B1 | 8/2003 | Baker et al. | 370/252 |
| 6,615,258 | B1 | 9/2003 | Barry et al. | 709/223 |
| 6,654,932 | B1 * | 11/2003 | Bahrs et al. | 715/507 |
| 6,675,228 | B1 * | 1/2004 | Bahrs et al. | 719/318 |
| 6,748,570 | B1 * | 6/2004 | Bahrs et al. | 715/526 |
| 6,772,172 | B2 * | 8/2004 | Leong et al. | 707/3 |
| 6,779,155 | B1 * | 8/2004 | Bahrs et al. | 715/526 |
| 6,779,177 | B1 * | 8/2004 | Bahrs et al. | 717/173 |
| 6,782,508 | B1 * | 8/2004 | Bahrs et al. | 715/526 |
| 6,829,771 | B1 * | 12/2004 | Bahrs et al. | 719/318 |
| 6,862,686 | B1 * | 3/2005 | Bahrs et al. | 713/201 |
| 6,862,711 | B1 * | 3/2005 | Bahrs et al. | 715/526 |
| 6,886,170 | B1 * | 4/2005 | Bahrs et al. | 719/318 |
| 6,901,554 | B1 * | 5/2005 | Bahrs et al. | 715/526 |
| 2002/0109734 | A1 | 8/2002 | Umezu et al. | 345/846 |
| 2002/0152294 | A1 * | 10/2002 | Evans et al. | 709/223 |
| 2002/0188592 | A1 * | 12/2002 | Leonhardt et al. | 707/1 |

OTHER PUBLICATIONS

Boone, "Harvesting Design for an Application Framework", Proceedings of the 1996 Conference of the Centre for Advanced Studies on Collaborative Research, Nov. 1996, pp. 1-9.

Schuckmann et al., "Designing Object-Oriented Synchronous Groupware with COAST", Proceedings of the 1996 ACM Conference on Computer Supported Cooperative Work, Nov. 1996, pp. 30-38.

Lemay et al., "Laura's Lemay's Web Workshop JavaScript", Sams.net, 1996, pp. 132-137.

Vanheisuwe, "Mastering JavaBeans", Sybex, 1997, chapter 3.

Zukowski, "Mastering Java 2", Sybex, 1998, chapters, 12, 14, 22.

Weber, "Advanced JFC", QUE, 1998, chapter 24.

IBM TDB, "Sequencing Event Handlers in Java", vol. 24, No. 423, Jul. 1999.

Bryant et al., "Automatic Parallelization of Object-Oriented Programming Languages Using Tuple Space", ACM pp. 89-96, 1995.

Hadjerroult, "A Constructivist Approach to Object-Oriented Design and Programming, ", ITICSE ACM, pp. 171-174, Feb. 1999.

Jarvinen et al., "Object-Oriented Specification of Reactive Systems", IEEE, pp. 63-71, 1990.

McDonald et al., "Painting Multiple View of Complex Objects", 1990, ACM, 245-257.

Grundy et al., "Support for Constructing Environments with Multiple View", 1996, ACM, pp. 212-216.

* cited by examiner

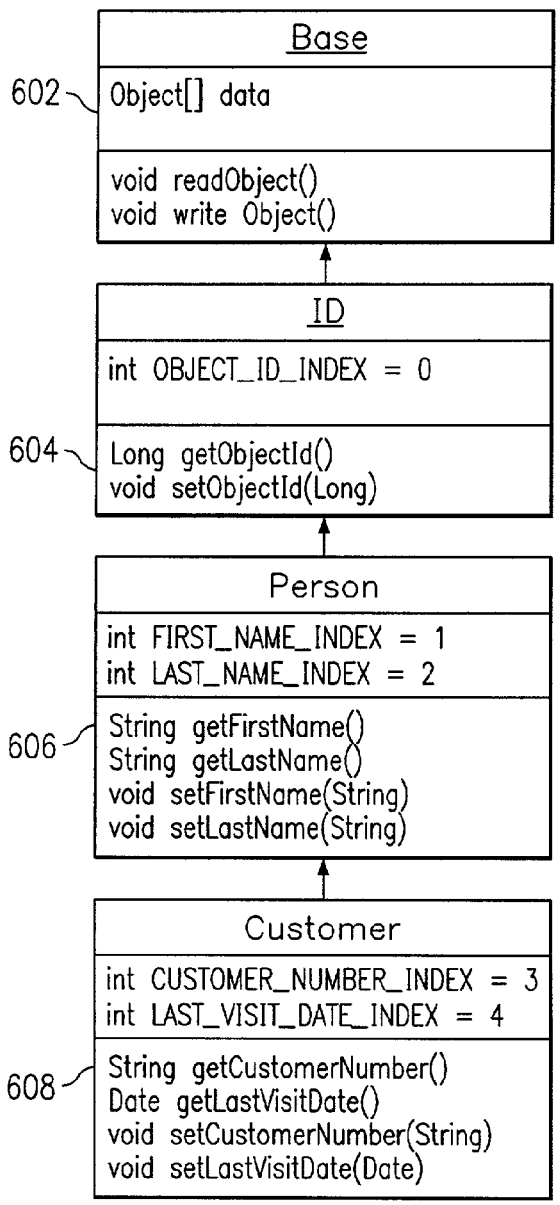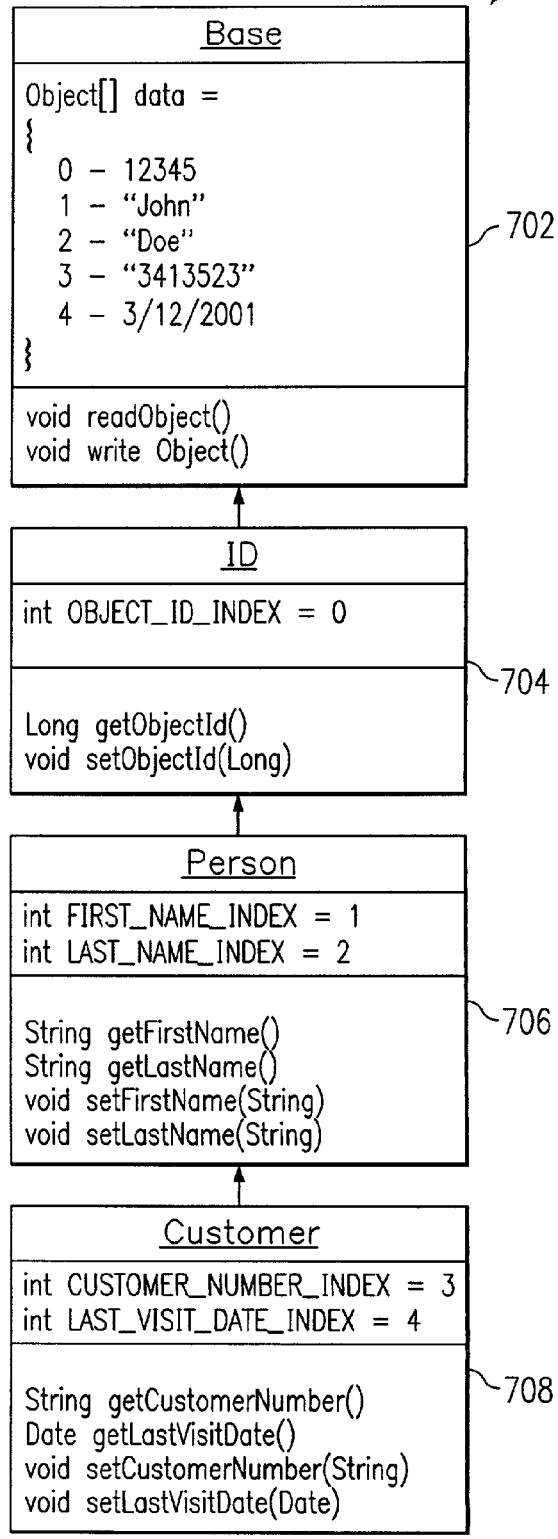
FIG. 6
FIG. 7

METHOD, SYSTEM, AND PRODUCT FOR STORAGE OF ATTRIBUTE DATA IN AN OBJECT ORIENTED ENVIRONMENT

CROSS REFERENCE TO RELATED APPLICATIONS

The present invention is related to the following applications entitled: "Method And Apparatus In A Data Processing System For Refreshing Multiple Data Models In An Application", U.S. application Ser. No. 09/429,212, now U.S. Pat. No. 6,779,177 filed on Oct. 28, 1999; "Method and Apparatus in a Data Processing System for Systematically Separating Application Graphical User Interface Component Placement From Component Sequencing And Component Creation", U.S. application Ser. No. 09/429,522, now U.S. Pat. No. 6,901,554, filed on Oct. 28, 1999; "Method and Apparatus in a Data Processing System For Systematically Separating Application Components From Legacy System Services", U.S. application Ser. No. 09/430,355, now U.S. Pat. No. 6,829,771, filed on Oct. 28, 1999; "Method and Apparatus in a Data Processing System For The Issuance And Delivery Of Lightweight Requests To Concurrent And Multiple Service Providers", U.S. application Ser. No. 09/430,814, now U.S. Pat. No. 6,886,170, filed on Oct. 29, 1999; "Method and Apparatus in a Data Processing System For The Controlling And Sequencing Of Graphical User Interface Components And Mediating Access To System Services For Those Components", U.S. application Ser. No. 09/430,324, now U.S. Pat. No. 6,779,155, filed on Oct. 29, 1999; "Method and Apparatus In A Data Processing System For Defining And Composing Type-Based (Multi-Level) Field Validation and Formatting Rules", U.S. application Ser. No. 09/430,824, now U.S. Pat. No. 6,654,932, filed on Oct. 29, 1999; "Method and Apparatus in a Data Processing System For The Separation Of Role-Based Permissions Specification From Its Corresponding Implementation Of Its Semantic Behavior", U.S. application Ser. No. 09/430,861, now U.S. Pat. No. 6,862,686, filed on Oct. 29, 1999; "Method and Apparatus in a Data Processing System For Generating Alternate Views of Client Applications", U.S. application Ser. No. 09/430,823, now U.S. Pat. No. 6,675,228, filed on Oct. 29, 1999; "Method and Apparatus in a Data Processing System Of Creating Highly Reusable Application Function Sequencers Using Graph-Based Partitioning", U.S. application Ser. No. 09/429,528, now U.S. Pat. No. 6,782,508, filed on Oct. 28, 1999; "Method and Apparatus in a Data Processing System For Specifying The Sequencing And Mediation Of Application Components", U.S. application Ser. No. 09/431,429, filed on Oct. 29, 1999; "Method and Apparatus in a Data Processing System For Systematically Serializing Complex Data Structures", U.S. application Ser. No. 09/429,593, now U.S. Pat. No. 6,862,711, filed on Oct. 28, 1999; "Method and Apparatus in a Data Processing System For Processing Events In An Object Oriented Environment", U.S. application Ser. No. 09/429,592, now U.S. Pat. No. 6,748,570, filed on Oct. 28, 1999; all of which are assigned to the same assignee.

BACKGROUND OF THE INVENTION

1. Technical Field

The present invention relates generally to an improved distributed data processing system and, in particular to an improved system, method, and computer program product within an object oriented environment. Still more particularly, the present invention relates to a system, method, and computer program product for storage of attribute data in an object oriented environment in such a manner as to reduce the logic to store attributes and the amount of storage space for those attributes.

2. Description of Related Art

Object-oriented languages have been employed in creating applications. One of the big advantages of object-oriented languages is the ability to reuse portions of the software code. Reuse of the code is achieved through inheritance. In many cases, inheritance can make development of new classes very simple because the logic of a parent class need not be reinvented for each child of that parent class.

This advantage does not normally apply, however, to functions that act on the attributes of a class. These functions must be rewritten for each subclass so that the attributes of each subclass are acted upon. One such example is when the attributes of an object must be converted to another representation, such as XML data, or a byte stream.

FIG. 1 depicts an object definition having attributes defined within classes and having attribute data stored within the class in which the attribute is defined in accordance with the prior art. Object 10 includes an ID class 12, a person class 14, and a customer class 16. Person class 14 is a subclass of ID class 12. And, customer class 16 is a subclass of person class 14.

An object identifier (ID) attribute is defined within ID class 12. A first name attribute and a last name attribute are defined within person class 14. A customer number attribute and a last visit date attribute are defined within customer class 16. The object identifier data will be stored in ID class 12. The first name data and last name data will both be stored in the person class 14. The customer number data and last visit date data will both be stored in the customer class 16. Thus, the attribute data is stored within the class in which the associated attribute is defined.

FIG. 2 illustrates a particular instance of an object 20, having an object definition defined as depicted by FIG. 1, in accordance with the prior art. An object identifier, "12345", is stored within ID class 22. A first name, "John", and a last name, "Doe", are both stored within person class 24. A customer number, "3413523", and a last visit date, "Mar. 12, 2001", are both stored within customer class 26.

Methods, or logic, that need to act upon all attribute data of object 10 must be written for each class for which one or more attributes are defined. As depicted by FIG. 2, a "read object" method and a "write object" method are both defined within each class, i.e. ID class 22, person class 24, and customer class 26. The "read object" method will read all of the attribute data for only the class within which the "read object" method is defined. Similarly, the "write object" method will write all of the attribute data for only the class within which the "write object" method is defined. In order to act upon all attribute data of object 20, these methods must be defined for each class of object 20.

The read and write object methods defined within ID class 22 will read and write only the object ID data, "12345". The read and write object methods defined within person class 24 will read and write only the first name and last name data, "John" and "Doe". The read and write object methods defined within customer class 26 will read and write only the customer number and last visit date data, "3413523" and "Mar. 12, 2001".

Thus, as depicted by FIGS. 1 and 2, the code, or logic, must be written for each class of an object in order to act upon all of the attributes of the object.

Therefore, it would be advantageous to have an improved method, system, and product for storage of attribute data in an object oriented environment in such a manner as to reduce attribute logic contained in the "readObject" and "writeObject" methods.

SUMMARY OF THE INVENTION

A method, system, and computer program product are described for storing attribute data in an object oriented environment. A base class and a subclass are defined within an object. The object is defined within the object oriented environment. An attribute is defined within the subclass. The attribute data defined for the subclass is stored only within the base class, and is not stored within the subclass.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts an object definition having attributes defined within classes but having all attribute data for these attributes stored in a base superclass in accordance with the present invention;

FIG. 7 illustrates an instance of an object where all attribute data is stored only in a base class, where the object has an object definition defined as depicted by FIG. 6, in accordance with the present invention;

DETAILED DESCRIPTION OF THE PREFERRED EMBODIMENT

The present invention provides for storage of all attribute data of an object within a specialized base class. The base class is the superclass of the object.

One or more attributes are defined within subclasses of the object. A separate index is defined for and associated with each attribute. The attribute data for an attribute, along with the index defined for that attribute, are both stored in a storage attribute within the base class.

In this manner, no attribute data is stored in the subclasses of the object. All of the attribute data is stored in a storage attribute defined within the base class. By storing all of the attribute data in a base, superclass, the base class has knowledge of and access to all attribute data.

Figure 1:
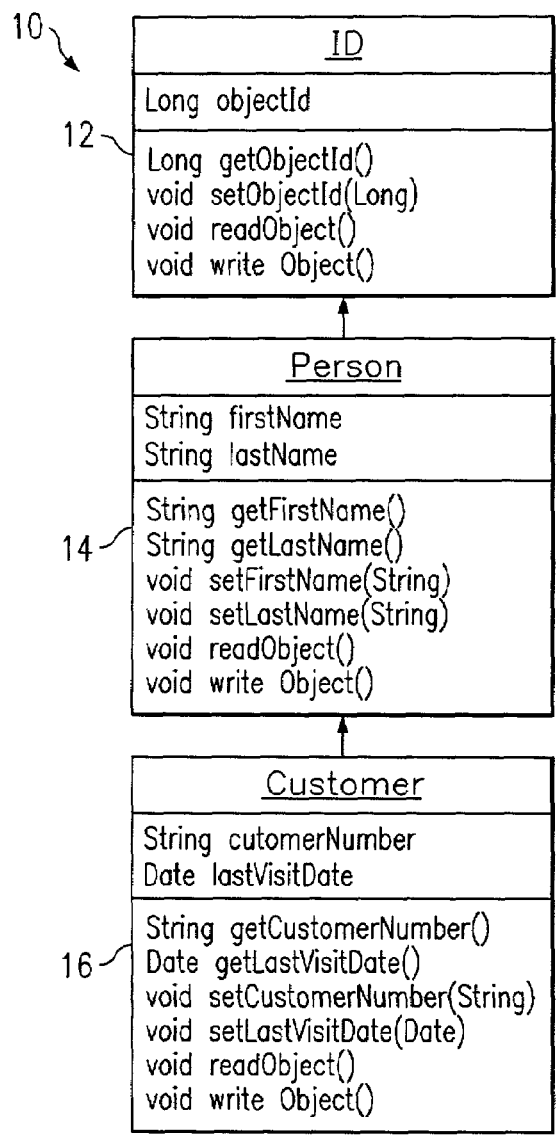
FIG. 1 depicts an object definition having attributes defined within classes and having attribute data stored within the class in which the attribute is defined in accordance with the prior art.
Figure 2:
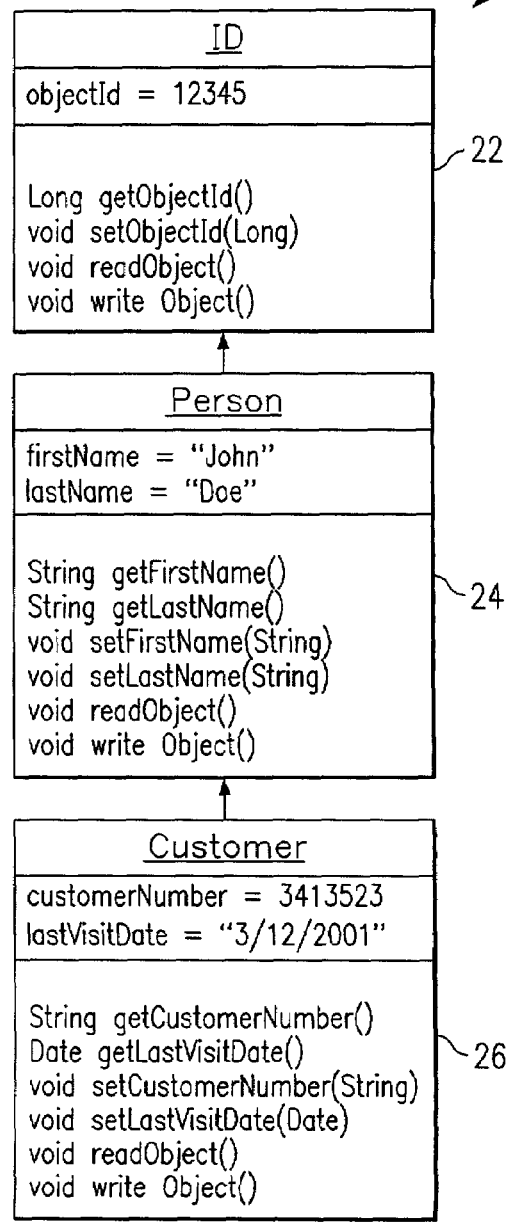
FIG. 2 illustrates an instance of an object, having an object definition defined as depicted by FIG. 1, in accordance with the prior art.
Figure 3:
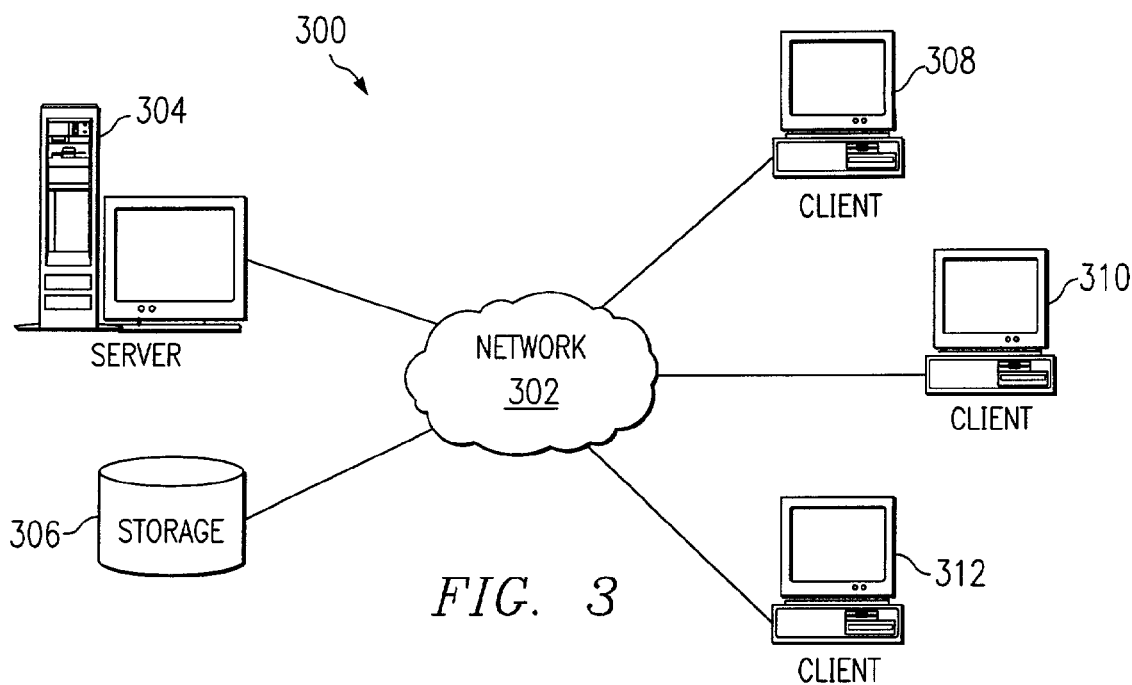
FIG. 3 depicts a pictorial representation of a distributed data processing system in which the present invention may be implemented.

With reference now to the figures, FIG. 3 depicts a pictorial representation of a distributed data processing system in which the present invention may be implemented. Distributed data processing system 300 is a network of computers in which the present invention may be implemented. Distributed data processing system 300 contains a network 302, which is the medium used to provide communications links between various devices and computers connected together within distributed data processing system 300. Network 302 may include permanent connections, such as wire or fiber optic cables, or temporary connections made through telephone connections.

In the depicted example, a server 304 is connected to network 302 along with storage unit 306. In addition, clients 308, 310, and 312 also are connected to a network 302. These clients 308, 310, and 312 may be, for example, personal computers or network computers. For purposes of this application, a network computer is any computer, coupled to a network, which receives a program or other application from another computer coupled to the network. In the depicted example, server 304 provides data, such as boot files, operating system images, and applications to clients 308–312. Clients 308, 310, and 312 are clients to server 304. Distributed data processing system 300 may include additional servers, clients, and other devices not shown.

In the depicted example, distributed data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 300 also may be implemented as a number of different types of networks, such as for example, an intranet, a local area network (LAN), or a wide area network (WAN). FIG. 3 is intended as an example, and not as an architectural limitation for the present invention.

Figure 4:
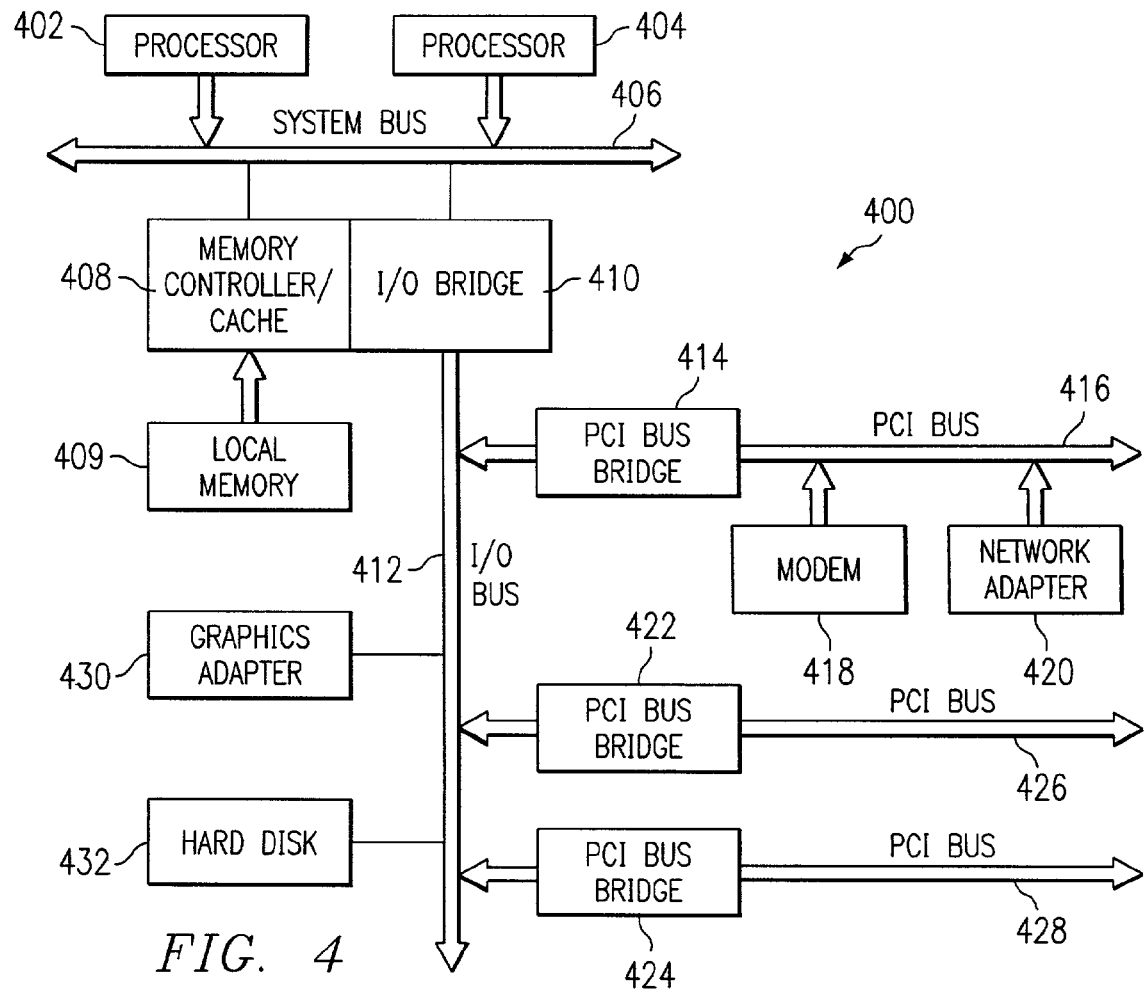
FIG. 4 is a block diagram depicting a data processing system that may be implemented as a server in accordance with a preferred embodiment of the present invention.

Referring to FIG. 4, a block diagram depicts a data processing system that may be implemented as a server, such as server 304 in FIG. 3, in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI bus 416. Typical PCI bus implementations will support four PCI expansion slots or add-in connectors. Communications links to network computers 308–312 in FIG. 3 may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, server 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM RISC/System 6000 system, a product of International Business Machines Corporation in Armonk, N.Y., running the Advanced Interactive Executive (AIX) operating system.

Figure 5:
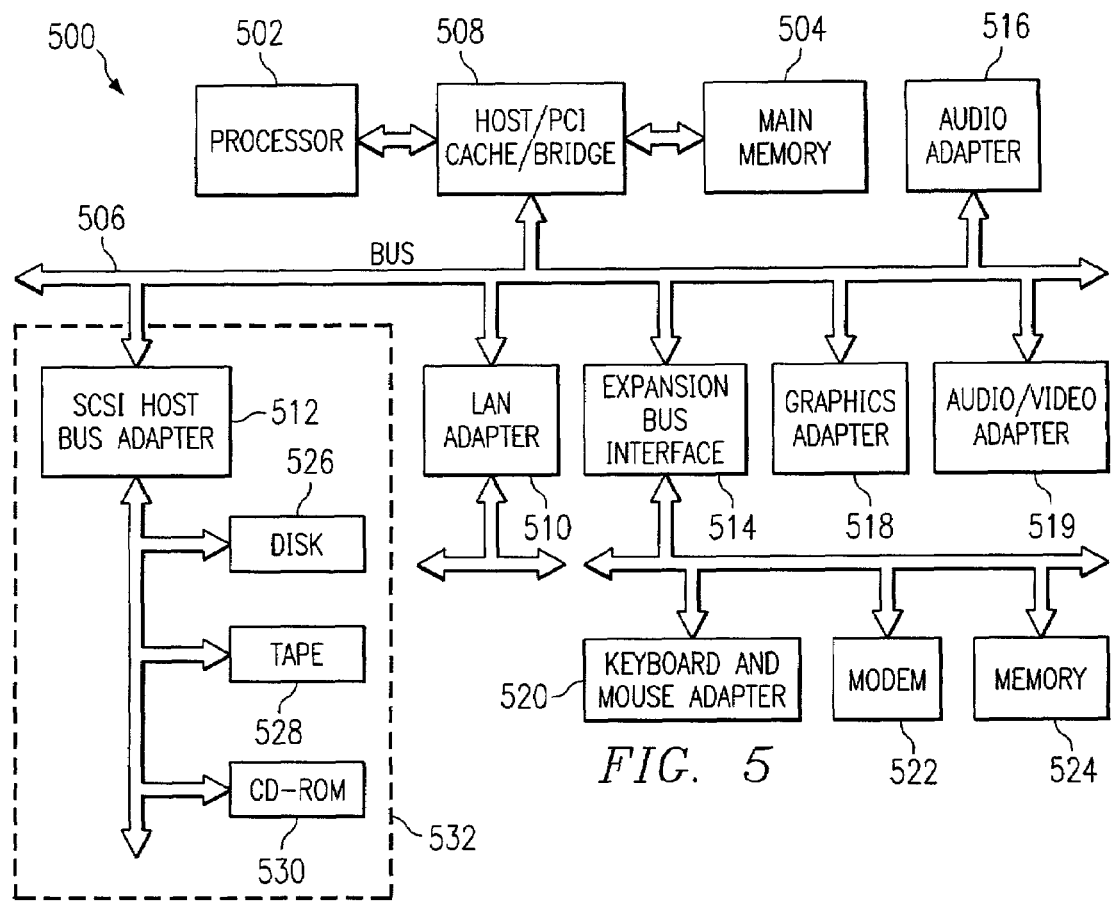
FIG. 5 is a block diagram illustrating a data processing system in which the present invention may be implemented.

With reference now to FIG. 5, a block diagram illustrates a data processing system in which the present invention may be implemented. Data processing system 500 is an example of a client computer. Data processing system 500 employs a peripheral component interconnect (PCI) local bus architecture. Although the depicted example employs a PCI bus, other bus architectures such as Micro Channel or Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, Small Computer System Interface host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. Small computer system interface (SCSI) host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 500. "Java" is a trademark of Sun Microsystems, Inc. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

For example, data processing system 500, if optionally configured as a network computer, may not include SCSI host bus adapter 512, hard disk drive 526, tape drive 528, and CD-ROM 530, as noted by dotted line 532 in FIG. 5 denoting optional inclusion. In that case, the computer, to be properly called a client computer, must include some type of network communication interface, such as LAN adapter 510, modem 522, or the like. As another example, data processing system 500 may be a stand-alone system configured to be bootable without relying on some type of network communication interface, whether or not data processing system 500 comprises some type of network communication interface. As a further example, data processing system 500 may be a Personal Digital Assistant (PDA) device, which is configured with ROM and/or flash ROM in order to provide nonvolatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

FIG. 6 depicts an object definition having attributes defined within classes but having all attribute data for these attributes stored only in a base superclass in accordance with the present invention. Object 600 includes a base class 602, an ID class 604, a person class 606, and a customer class 608. ID class 604 is a subclass of base class 602. Person class 606 is a subclass of ID class 604. And, customer class 608 is a subclass of person class 606.

Base class 602 includes a storage attribute, "Object[ ] data" which is the Java definition for an array of objects of type "Object". All attribute data of object 600 will be stored in this storage attribute. Programmers with ordinary skill in the art will realize that other data storage structures such as a vector could be used instead.

The number of attributes defined by all of the subclasses of object 600 must be provided to base class 602 when object 600 is created. Base class 602 then sets aside the required array size to accommodate the total number of attributes. When object 600 is created these indexes are predefined and associated with particular attributes. Subclasses may access their attribute data by referencing the appropriate array index.

An object identifier (ID) attribute is defined within ID class 604. An index of "0" is defined and associated with the object identifier attribute. The object identifier data is not stored in the ID class 604. The object identifier data is stored in the "Object[ ] data" attribute at the "0" index.

A first name attribute and a last name attribute are defined within person class 606. An index of "1" is defined and associated with the first name attribute, and an index of "2" is defined and associated with the last name attribute. The first name data is stored in the "Object[ ] data" attribute at the "1" index. The last name data is stored in the "Object[ ] data" attribute at the "2" index.

A customer number attribute and a last visit date attribute are defined within customer class 608. An index of "3" is defined and associated with the customer number attribute, and an index of "4" is defined and associated with the last visit date attribute. The customer number data is stored in the "Object[ ] data" attribute at the "3" index. The last visit date data is stored in the "Object[ ] data" attribute at the "4" index.

Thus, all of the attribute data for object 600 is stored in the base class within the storage attribute, "Object[ ] data". None of this attribute data is stored within ID class 604, person class 606, or customer class 608.

In order to prevent errors and allow for the classes to be more easily maintained, a constant should be defined in each class to indicate the last index used by that class. Each subclass should define their indexes relative to the last index used by the super class, indicated by the constant. When an attribute is added to a class, the last index will be updated and all of the subclasses, through the use of the constant, will be automatically updated.

Because all of the attribute data is stored within the base class, methods that need to act upon all attribute data need to be written only for the base class. As depicted by FIG. 6, a "read object" method and a "write object" method are both defined within base class 602. The "read object" method will read all of the attribute data for object 600, and the "write object" method will write all of the attribute data for object 600. These methods do not need to be defined for each subclass. Thus, these methods are not defined for ID class 604, person class 606, or customer class 608.

FIG. 7 illustrates an instance of an object 700, which is defined as depicted by FIG. 6, where all attribute data is stored only in base class 702 in accordance with the present invention. All attribute data of object 700 is stored within the "Object[ ] data" storage attribute defined in base class 702. An object identifier, "12345", is stored at index "0". A first name, "John", is stored at index "1". A last name, "Doe", is stored at index "2". A customer number, "3413523", is stored at index "3". And, a last visit date, "Mar. 12, 2001", is stored at index "4". None of this attribute data is stored in the class in which the associated attribute is defined.

One particular example of a case where all attribute data defined for an object needs to be acted upon is when the object is serialized or deserialized. When an object is serialized, all of the attribute data of the object is written to a data stream. When an object is deserialized, all of the attribute data of the object is read from a data stream. Using the present invention, this process of writing and reading all of the attribute data of an object may be accomplished by providing read and write methods only for the base object.

Within the write method, all of the attribute data must be written to a data stream. To accomplish this using the present invention, the size of the data array containing all of the attribute data should be written to the data stream first. After the size of the array is written, each of the elements in the array should also be written to the data stream.

When reading the data from the stream, the information must be read in the same order as it was written. In this case, the size of the data array will be read first. This value is used to create a new data array which will be used to store the attributes. Each of the attributes that were written to the data stream will then be read and put in the data array at the appropriate index.

The value of the present invention is that all of this logic is contained within a single class. To use a different algorithm for reading and writing the attribute values, the change can be made easily in a single place.

Figure 8:
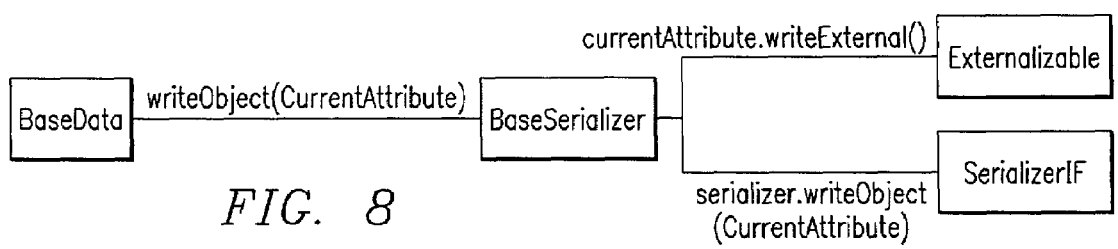
FIG. 8 is a diagram of a serializer system in accordance with a preferred embodiment of the present invention.
Figure 9:
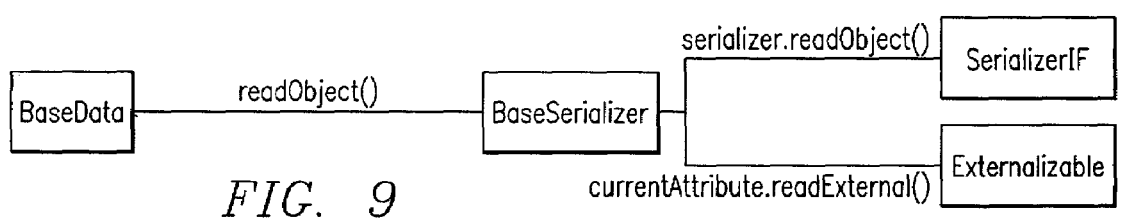
FIG. 9 is a diagram of a deserializer system in accordance with a preferred embodiment of the present invention.

The present invention may be utilized in a serialization and deserialization process such as depicted by FIGS. 8 and 9.

The present invention is related to the subject matter of U.S. Pat. No. 6,292,933 issued to Peter C. Bahrs et al. on Sep. 18, 2001, which is hereby incorporated by reference.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted architectural pattern is illustrated in a Java programming environment, the architectural pattern of the present invention may be applied to other types of programming environments. For example, VisualBasic, C++ and Smalltalk are other programming environments in which the processes of the present invention may be applied. In addition, the description of the classes along with the variables, constructors, and methods are provided for purposes of illustration only. Classes, variables, constructors, and methods may vary depending on the particular implementation. Illustration of these classes, variables, constructors are for illustrative purposes and not intended to limit the architectural pattern of the present invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for executing and processing data in an object oriented environment, said method comprising the data processing system implemented steps of:

defining, within an object, a base class and a subclass that is a subclass of said base class, said base class and said subclass being included within said object, said object defined within said object oriented environment;

defining an attribute within said subclass; and storing, within said base class, attribute data defined for said attribute, said attribute data being stored only within said base class.

2. The method according to claim 1, further comprising:

defining a first subclass and a second subclass within said object;

said first subclass being a subclass of said base class;

said second subclass being a subclass of said first subclass;

defining a first attribute within said first subclass;

defining a second attribute within said second subclass; and storing, within only said base class, attribute data, defined for said first and second attributes, said attribute data being stored only within said base class and not within either said first or second subclasses.

3. The method according to claim 1, further comprising the steps of:

defining a storage attribute within said base class; and storing within storage attribute said attribute data.

4. The method according to claim 1, further comprising the steps of:
defining a second subclass, wherein said subclass is a superclass to said second subclass;
defining a second attribute within said second subclass; and
storing within said base class second attribute data for said second attribute, wherein said second attribute data is not stored within said second subclass or said subclass.

5. The method according to claim 4, further comprising the steps of:
defining a storage attribute within said base class; and
storing within storage attribute said attribute data and said second attribute data.

6. The method according to claim 5, further comprising the steps of:
defining a first index for and associating it with said attribute;
defining a second index for and associating it with said second attribute;
storing within said storage attribute said attribute data with said first index; and
storing within said storage attribute said second attribute data with said second index.

7. The method according to claim 1, further comprising the steps of:
defining an index for and associating it with said attribute; and
storing within said base class said attribute data for said attribute with said index.

8. The method according to claim 7, further comprising the steps of:
defining a method that needs to act on all attribute data of an object; and
defining said method only for said base class, wherein said method acts on attribute data stored in said storage attribute.

9. The method according to claim 7, further comprising the steps of:
defining a write object method to write all object attribute data; and
defining said method only for said base class, wherein said method will write all data stored in said storage attribute.

10. The method according to claim 1, further comprising the steps of:
defining a method that needs to act on all attribute data of an object; and
defining said method only for said base class, wherein said method acts on said attribute data.

11. The method according to claim 1, farther comprising the step of defining said base class within said object, said base class being a superclass of said object.

12. A data processing system for executing and processing data in an object oriented environment, said object oriented environment comprising:
a base class and a subclass defined within an object, said subclass being a subclass of said base class, said base class and said subclass being included within said object, said object defined within said object oriented environment;
an attribute defined within said subclass; and
said base class for storing attribute data defined for said attribute, said attribute data being stored only within said base class.

13. The system according to claim 12, further comprising:
a first subclass and a second subclass defined within said object;
said first subclass being a subclass of said base class;
said second subclass being a subclass of said first subclass;
a first attribute defined within said first subclass;
a second attribute defined within said second subclass; and
only said base class storing attribute data defined for said first and second attributes, said attribute data being stored only within said base class and not within either said first or second subclasses.

14. The system according to claim 12, further comprising:
a storage attribute within said base class; and
storage attribute for storing said attribute data.

15. The system according to claim 12, further comprising:
a second subclass, wherein said subclass is a superclass to said second subclass;
a second attribute within said second subclass; and
said base class for storing second attribute data for said second attribute, wherein said second attribute data is not stored within said second subclass or said subclass.

16. The system according to claim 15, further comprising:
a storage attribute within said base class; and
storage attribute for storing said attribute data and said second attribute data.

17. The system according to claim 16, further comprising:
a first index defined for and associated with said attribute;
a second index defined for and associated with said second attribute;
said storage attribute for storing said attribute data with said first index; and
said storage attribute for storing said second attribute data with said second index.

18. The system according to claim 12, further comprising:
an index defined for and associated with said attribute; and
said base class for storing said attribute data for said attribute with said index.

19. The system according to claim 18, further comprising:
a method being defined that needs to act on all attribute data of an object; and
said method being defined only for said base class, wherein said method acts on attribute data stored in said storage attribute.

20. The system according to claim 18, further comprising:
a write object method being defined to write all object attribute data; and
said method being defined only for said base class, wherein said method will write all data stored in said storage attribute.

21. The system according to claim 12, further comprising:
a method being defined that needs to act on all attribute data of an object; and
said method being defined only for said base class, wherein said method acts on said attribute data.

22. The system according to claim 12, further comprising said base class being defined within said object, said base class being a superclass of said object.

23. A computer program stored in a computer readable storage medium product in a data processing system for executing and processing data in an object oriented environment, said product comprising:
instruction means for defining, within an object, a base class and a subclass that is a subclass of said base class, said base class and said subclass being included within said object, said object defined within said object oriented environment;

instruction means for defining an attribute within said subclass; and instruction means for storing, within said base class, attribute data defined for said attribute, said attribute data being stored only within said base class.

24. The product according to claim 23, further comprising:

instructions for defining a first subclass and a second subclass within said object;

said first subclass being a subclass of said base class;

said second subclass being a subclass of said first subclass;

instructions for defining a first attribute within said first subclass;

instructions for defining a second attribute within said second subclass; and instructions for storing, within only said base class, attribute data defined for said first and second attributes, said attribute data being stored only within said base class and not within either said first or second subclasses.

25. The product according to claim 23, further comprising:

instruction means for defining a storage attribute within said base class; and instruction means for storing within storage attribute said attribute data.

26. The product according to claim 23, further comprising:

instruction means for defining a second subclass, wherein said subclass is a superclass to said second subclass;

instruction means for defining a second attribute within said second subclass; and instruction means for storing within said base class second attribute data for said second attribute, wherein said second attribute data is not stored within said second subclass or said subclass.

27. The product according to claim 26, further comprising:

instruction means for defining a storage attribute within said base class; and instruction means for storing within storage attribute said attribute data and said second attribute data.

28. The product according to claim 27, further comprising:

instruction means for defining a first index for and associating it with said attribute;

instruction means for defining a second index for and associating it with said second attribute;

instruction means for storing within said storage attribute said attribute data with said first index; and instruction means for storing within said storage attribute said second attribute data with said second index.

29. The product according to claim 23, further comprising:

instruction means for defining an index for and associating it with said attribute; and instruction means for storing within said base class said attribute data for said attribute with said index.

30. The product according to claim 29, further comprising:

instruction means for defining a method that needs to act on all attribute data of an object; and instruction means for defining said method only for said base class, wherein said method acts on attribute data stored in said storage attribute.

31. The product according to claim 29, further comprising:

instruction means for defining a write object method to write all object attribute data; and instruction means for defining said method only for said base class, wherein said method will write all data stored in said storage attribute.

32. The product according to claim 23, further comprising:

instruction means for defining a method that needs to act on all attribute data of an object; and instruction means for defining said method only for said base class, wherein said method acts on said attribute data.

33. The product according to claim 23, further comprising instruction means for defining said base class within said object, said base class being a superclass of said object.

* * * * *